J. Shackleton.
Steam Heater.
No. 3,843. Reissued Feb. 15, 1870.
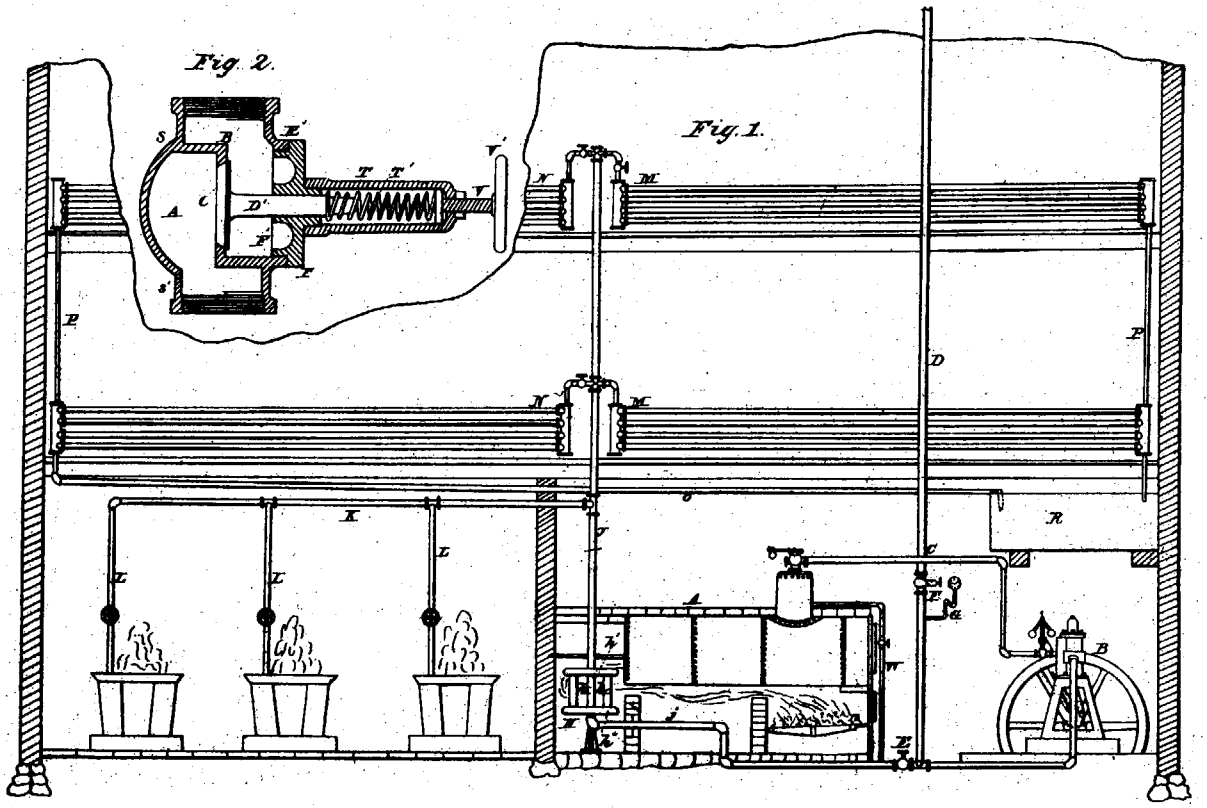
Witnesses.
D. L. Humphrey
J. L. Burridge
Inventor.
J. Shackleton.

United States Patent Office.

JOSEPH SHACKLETON, OF RAHWAY, NEW JERSEY.

*Letters Patent No.* 87,301, *dated February* 23, 1869; *reissue No.* 3,843, *dated February* 15, 1870.

DIVISION NO. 1.

STEAM-HEATER.

The Schedule referred to in these Letters Patent and making part of the same.

I, JOSEPH SHACKLETON, of Rahway, Union county, State of New Jersey, have invented a new and useful Mode of Utilizing the Exhaust Steam of Engines to Heat Buildings, and for heating dyers' kettles, soap-boilers, and the various purposes wherein live steam is now employed; and I do hereby declare that the following is a full, clear, and exact description of the mode or system employed, reference being had to the annexed drawings making part of this specification.

Figure 1 represents a cross-section of the building, with the location of the boiler A, engine B, steam-pipe C, exhaust D, by-pass W, superheater H, heating pipe J, and heating series M M N N; also boiler-heating pipes K and L L L.

P P are condensing pipes.

O is the return condensing pipe leading to the tank or boiler-feeder R.

G is a back-pressure gauge.

Figure 2 represents the automatic or self-acting exhaust-valve, which is placed on the exhaust-pipe at F.

The operation of this system of heating by exhaust steam consists in conducting the steam, after it has actuated the engine, into the reheater or superheater H, where it gains a greatly increased temperature.

It is then passed through pipe J into the series of heaters M M N N K L L L, where it radiates its surplus heat to warm buildings, or to heat dyers' kettles, and the various heating purposes for which steam is ordinarily employed.

The superheater H consists of a series of pipes, *h*, connecting at their ends with and opening into the chambered heads *h′ h″*, so arranged as to allow the steam to pass from the exhaust-pipe *j* through the head *h″*, pipes *h*, head *h′*, into the pipe J, thus exposing the steam to a large amount of fire-surface, which rapidly elevates its temperature.

After the steam has made its circuit in the series of heating pipes M M N N, &c., it becomes condensed and flows back through pipes P P and O into tank or feeder R in the form of pure distilled water of a high temperature, which is again returned to the boiler, thereby saving fuel and preventing incrustation in the boiler.

It will be observed that the exhaust steam is reheated by the waste heat of the furnace that heats the boiler, at little or no extra expense for fuel.

When the engine B is not at work, valve E is closed, and steam is taken directly from the boiler A through the by-pass pipe W, and passed through the reheater in the usual manner, to supply the heating system.

The automatic valve at F, more fully shown at fig. 2, is arranged with a spiral spring in stem T, which holds the valve to its seat.

Screw V regulates the tension of the spring. The office of this valve is to open when the back pressure is too great and give direct exit to the steam, and prevent reacting upon or stopping the engine.

By this system of reheating and utilizing exhaust steam, a large per cent. of fuel may be saved.

What I claim, and desire to secure by Letters Patent of the United States, is—

The utilizing the waste or escaping heat from a boiler or furnace for reheating exhaust steam by means of the superheater H, in connection with the system of heating as substantially herein described.

JOSEPH SHACKLETON.

Witnesses:

NATHANIEL GILL,

WM. H. CLARKSON.